US012179787B2

(12) United States Patent  (10) Patent No.: US 12,179,787 B2
Nallani et al.  (45) Date of Patent: *Dec. 31, 2024

(54) PEDESTRIAN ALERT SYSTEM

(71) Applicant: Aptiv Technologies AG, Schaffhausen (CH)

(72) Inventors: Ajay Chandra Nallani, Rochester Hills, MI (US); Yang Yang, Troy, MI (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,078

(22) Filed: Jun. 14, 2023

(65) Prior Publication Data

US 2023/0322253 A1  Oct. 12, 2023

Related U.S. Application Data

(63) Continuation of application No. 17/654,571, filed on Mar. 11, 2022, now Pat. No. 11,718,314.

(51) Int. Cl.
*B60W 50/14* (2020.01)
*B60K 35/00* (2006.01)
(Continued)

(52) U.S. Cl.
CPC ............ *B60W 50/14* (2013.01); *B60K 35/00* (2013.01); *B60Q 3/16* (2017.02);
(Continued)

(58) Field of Classification Search
CPC .. B60W 50/14; B60W 30/0956; B60W 40/08; B60W 2040/0818;
(Continued)

(56) References Cited

U.S. PATENT DOCUMENTS 7,359,527 B2  4/2008  Breed et al.
7,777,646 B2  8/2010  Konforty et al.
(Continued)

FOREIGN PATENT DOCUMENTS

CN  204641663 U  9/2015
CN  105459950 A  4/2016
(Continued)

OTHER PUBLICATIONS

"Extended European Search Report", EP Application No. 23157703.2, Jul. 28, 2023, 8 pages.

(Continued)

*Primary Examiner* — Hongmin Fan
(74) *Attorney, Agent, or Firm* — Harness, Dickey & Pierce, P.L.C.

(57) ABSTRACT

This document describes a pedestrian alert system that can draw a driver's attention to a pedestrian on or near a roadway. The described pedestrian alert system can help prevent collisions with pedestrians and other objects in poor visibility environments or when drivers may be distracted. For example, a system can determine a presence of an object in or near a travel path of a host vehicle. The system can also determine the object's position relative to the host vehicle and control a light bar to provide an indication of the object. The indication can have specific characteristics to indicate the object's position relative to the host vehicle. In this way, the described pedestrian alert system can utilize sensors to focus a driver's attention on an object before a potential crash occurs and reduce the number of traffic-related deaths.

20 Claims, 7 Drawing Sheets

(51) Int. Cl.
| | | |
|---|---|---|
| *B60Q 3/16* | (2017.01) | |
| *B60W 30/095* | (2012.01) | |
| *B60W 40/08* | (2012.01) | |
| *B60W 50/00* | (2006.01) | |
| *G06V 20/59* | (2022.01) | |
| *B60K 35/28* | (2024.01) | |
| *B60K 35/29* | (2024.01) | |

(52) U.S. Cl.
CPC ........ *B60W 30/0956* (2013.01); *B60W 40/08* (2013.01); *B60W 50/0097* (2013.01); *G06V 20/597* (2022.01); *B60K 35/28* (2024.01); *B60K 35/285* (2024.01); *B60K 35/29* (2024.01); *B60K 2360/178* (2024.01); *B60K 2360/1868* (2024.01); *B60K 2360/188* (2024.01); *B60K 2360/336* (2024.01); *B60W 2040/0818* (2013.01); *B60W 2050/146* (2013.01); *B60W 2420/403* (2013.01); *B60W 2420/408* (2024.01); *B60W 2540/225* (2020.02); *B60W 2540/229* (2020.02); *B60W 2554/4026* (2020.02); *B60W 2554/4029* (2020.02); *B60W 2554/4041* (2020.02); *B60W 2554/4044* (2020.02)

(58) Field of Classification Search
CPC ..... B60W 2050/146; B60W 2420/403; B60W 2420/408; B60W 2540/225; B60W 2540/229; B60W 2554/4029; B60W 2554/4041; B60W 2554/4044; G06V 20/597; B60K 35/28; B60K 35/285; B60K 35/29; B60K 2360/178; B60K 2360/1868; B60K 2360/188; B60K 2360/336
See application file for complete search history.

(56) References Cited

U.S. PATENT DOCUMENTS

| | | | |
|---|---|---|---|
| 9,290,174 B1* | 3/2016 | Zagorski | B60W 30/18 |
| 9,690,292 B1 | 6/2017 | Chan et al. | |
| 10,332,292 B1* | 6/2019 | Arnicar | G06F 3/011 |
| 10,391,972 B1 | 8/2019 | Chengalva | |
| 10,457,208 B1 | 10/2019 | Moffa | |
| 10,793,066 B2 | 10/2020 | Vincent et al. | |
| 11,423,759 B2 | 8/2022 | Yang et al. | |
| 2006/0244635 A1 | 11/2006 | Chavarria | |
| 2009/0132128 A1 | 5/2009 | Marriott et al. | |
| 2013/0021476 A1 | 1/2013 | Trummer | |
| 2013/0131906 A1 | 5/2013 | Green et al. | |
| 2014/0085070 A1 | 3/2014 | Schoenberg | |
| 2014/0104053 A1 | 4/2014 | Clark, Jr. | |
| 2015/0086077 A1 | 3/2015 | Du et al. | |
| 2015/0211868 A1* | 7/2015 | Matsushita | G01C 21/3638 |
| | | | 701/457 |
| 2015/0287325 A1 | 10/2015 | Drescher | |
| 2016/0185387 A1 | 6/2016 | Kuoch | |
| 2016/0288709 A1 | 10/2016 | Nespolo et al. | |
| 2016/0325676 A1 | 11/2016 | Yamada | |
| 2017/0082400 A1 | 3/2017 | York et al. | |
| 2017/0315550 A1 | 11/2017 | Ichikawa et al. | |
| 2018/0033277 A1 | 2/2018 | Entis | |
| 2018/0086346 A1 | 3/2018 | Fujisawa et al. | |
| 2018/0118109 A1 | 5/2018 | Fujisawa et al. | |
| 2018/0154903 A1 | 6/2018 | Song | |
| 2018/0231976 A1 | 8/2018 | Singh | |
| 2018/0349711 A1* | 12/2018 | Prasad | B60W 50/14 |
| 2019/0033875 A1 | 1/2019 | Barrera et al. | |
| 2019/0047417 A1 | 2/2019 | Aoi et al. | |
| 2019/0054856 A1 | 2/2019 | Salter et al. | |
| 2019/0056731 A1 | 2/2019 | Westbrook | |
| 2019/0077306 A1 | 3/2019 | Duncan et al. | |
| 2019/0111843 A1* | 4/2019 | Yamada | B60K 35/00 |
| 2019/0184898 A1 | 6/2019 | Zheng et al. | |
| 2019/0187700 A1 | 6/2019 | Zheng et al. | |
| 2019/0308552 A1 | 10/2019 | Dominick et al. | |
| 2019/0337533 A1 | 11/2019 | Kume et al. | |
| 2020/0070848 A1 | 3/2020 | Ozer | |
| 2020/0172049 A1 | 6/2020 | Scheele et al. | |
| 2020/0193829 A1 | 6/2020 | Cheng et al. | |
| 2021/0016805 A1 | 1/2021 | Oba et al. | |
| 2021/0078609 A1 | 3/2021 | Barth et al. | |
| 2021/0125521 A1 | 4/2021 | Telpaz et al. | |
| 2021/0380080 A1* | 12/2021 | Bielby | B60W 40/08 |

FOREIGN PATENT DOCUMENTS

| | | |
|---|---|---|
| CN | 107599904 A | 1/2018 |
| CN | 109153356 A | 1/2019 |
| DE | 102015218588 A1 | 3/2016 |
| DE | 102017202241 A1 | 8/2018 |
| DE | 102017204529 A1 | 9/2018 |
| DE | 102019006385 A1 | 3/2020 |
| JP | 2016012117 A | 1/2016 |
| WO | 2018202318 A1 | 11/2018 |
| WO | 2019029832 A1 | 2/2019 |

OTHER PUBLICATIONS

"Foreign Office Action", EP Application No. 21150035.0, Jul. 19, 2023, 5 pages.
"Extended European Search Report", EP Application No. 20217784.6, May 28, 2021, 7 pages.
"Extended European Search Report", EP Application No. 21150035.0, Jun. 28, 2021, 8 pages.
"Extended European Search Report", EP Application No. 22207856.0, Feb. 24, 2023, 8 pages.
"Foreign Office Action", CN Application No. 202110004102.0, Sep. 5, 2022, 18 pages.
Mehler, "Selected Observations Drawn from the AHEAD & AVT Consortia on Human Attention in Modern Driving with & without Automation", Massachusetts Institute of Technology, UNECE Global Forum for Road Traffic Safety (WP.1) & World Forum for the Harmonization of Vehicle Regulations (WP.29), Feb. 18, 2019, 15 pages.
Seppelt, et al., "Glass Half-Full: On-Road Glance Metrics Differentiate Crashes from Near-Crashes in the 100-Car Data", Accident Analysis & Prevention, vol. 107, Oct. 2017, pp. 48-62, 2017, 15 pages.

* cited by examiner

PEDESTRIAN ALERT SYSTEM

CROSS-REFERENCE TO RELATED APPLICATION

This application is a continuation of U.S. patent application Ser. No. 17/654,571, filed Mar. 11, 2022, the disclosure of which is hereby incorporated by reference in its entirety herein.

BACKGROUND

While a vehicle is operating under manual or automated control (e.g., via an assisted-driving or autonomous-driving system), the driver supervises the environment. For example, drivers must notice pedestrians and other objects (e.g., bicyclists, animals, skateboarders) near or in a roadway and take evasive action to avoid striking the pedestrians and objects. Many pedestrian fatalities in or near roads are due to driver distraction or poor visibility (e.g., low light, fog). When a driver is required to take control back from an assisted-driving or autonomous-driving system or take evasive action, the driver may not react in time to avoid a collision. Although some driving systems issue warnings to the driver (e.g., audible alert) or take evasive actions (e.g., hard braking) when a pedestrian or object is immediately in front of a vehicle, these systems can lead to uncomfortable driving or secondary crashes (e.g., with another car following the host vehicle).

SUMMARY

This document describes a pedestrian alert system that can draw a driver's attention to a pedestrian on or near a roadway. The described pedestrian alert system can help prevent collisions with pedestrians and other objects in poor visibility environments or when drivers may be distracted. For example, a system can determine a presence of an object (e.g., a pedestrian, bicyclist, animal) in or near a travel path of a host vehicle. The object's presence can be determined using sensor data from exterior sensors. The system can also determine the object's position relative to the host vehicle and control a light bar to provide an indication of the object. The indication can have specific characteristics to indicate the object's position relative to the host vehicle. In this way, the described pedestrian alert system can utilize the increased visibility and number of sensors to focus a driver's attention on an object before a potential crash occurs and reduce the number of traffic-related deaths.

As another example, the pedestrian alert system can also determine whether the driver is distracted based on sensor data from interior sensors. In response to determining that the driver is distracted and the object's presence in or near the travel path, the system can control the light bar to indicate the object with other characteristics. For example, the other characteristics can include a flashing red light. In this way, the described system can also improve vehicle safety by drawing an inattentive driver's focus to the object in or near a roadway.

This Summary introduces simplified concepts related to a pedestrian alert system, further described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of a pedestrian alert system are described in this document with reference to the following figures. The same numbers are often used throughout the drawings to reference like features and components:

FIGS. 4-1 through 4-6 illustrate example visible indicators of a pedestrian in or near a roadway generated by a pedestrian alert system in accordance with techniques of this disclosure; and FIG. 5 illustrates an example method of a pedestrian alert system.

DETAILED DESCRIPTION

Overview

Pedestrians account for an increasing number of traffic-related deaths. For example, pedestrians accounted for approximately seventeen percent of traffic-related deaths in 2019 compared to thirteen percent in 2010. While traffic-related deaths of pedestrians have increased over forty percent in the past decade, the number of all other types of traffic-related deaths has only increased by about five percent. Many of these pedestrian fatalities in or near roadways are related to driver distraction or poor visibility.

Some driving systems may issue warnings to the driver (e.g., audible alerts) when a pedestrian or object is immediately in front of a vehicle. These systems, however, may not be able to provide warnings early enough for the driver or another driving system to take evasive actions. Other driving systems may take evasive actions (e.g., hard braking) when a pedestrian is immediately in front of a vehicle, but these actions can lead to uncomfortable driving or secondary crashes.

In contrast, this document describes techniques and systems for a pedestrian alert system that can provide early alerts regarding pedestrians and focus a driver's attention on pedestrians. For example, the pedestrian alert system can determine a presence of an object (e.g., a pedestrian, bicyclist, animal) in or near a travel path of a host vehicle. The object's presence can be determined using sensor data from exterior sensors. The system can also determine the object's position relative to the host vehicle and control a light bar to provide an indication of the object. The indication can have specific characteristics to indicate the object's position relative to the host vehicle. In this way, the described pedestrian alert system can utilize the increased visibility and number of sensors to focus a driver's attention on an object before a potential crash occurs and reduce the number of traffic-related crashes. The system can also improve vehicle safety by alerting the driver to inattentive behavior when the vehicle is operating in an autonomous-driving mode and enable a smooth handover.

This example is just one example of the described pedestrian alert system. This document describes other examples and implementations.

Operating Environment

Figure 1:
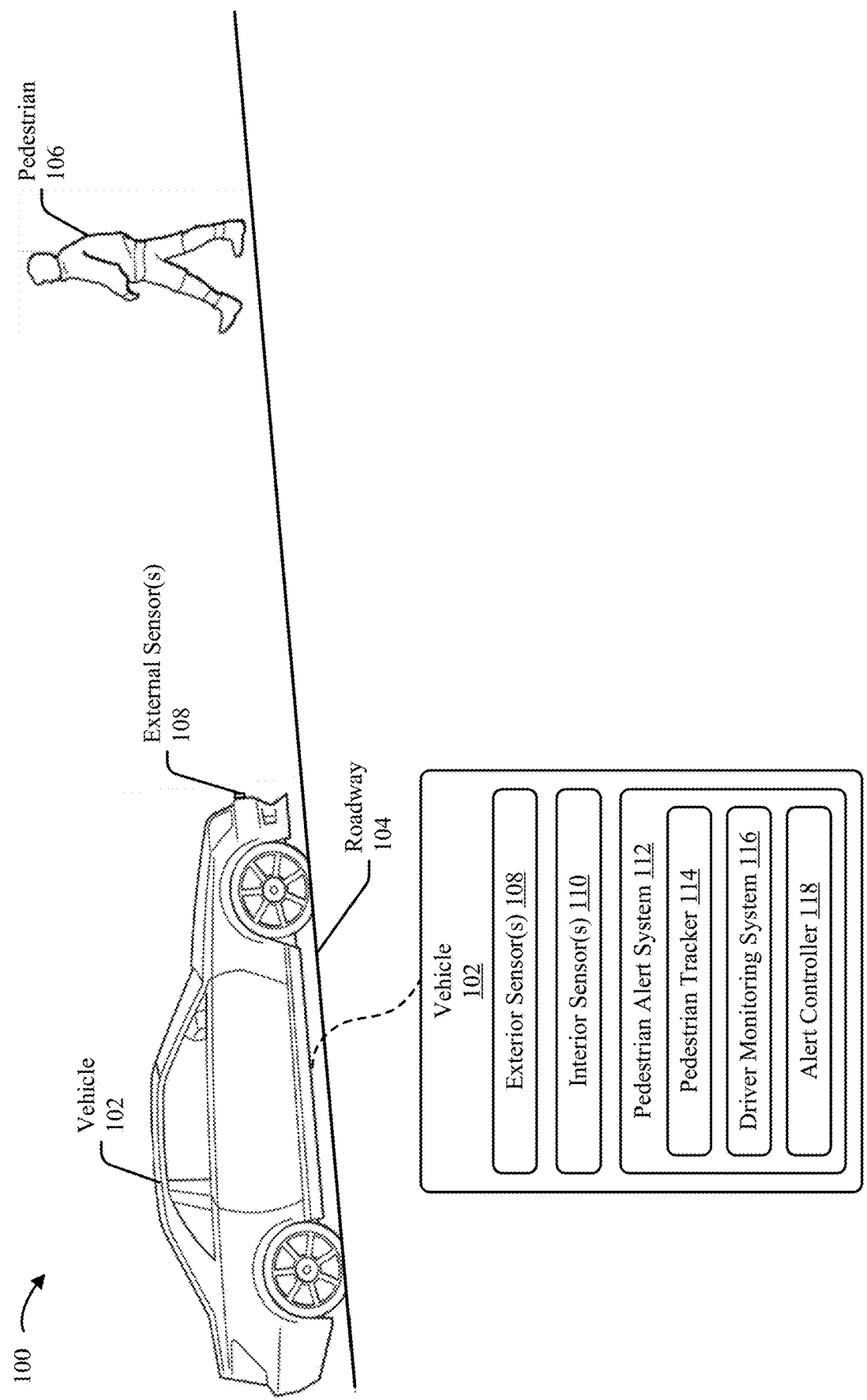
FIG. 1 illustrates an example environment in which a pedestrian alert system can be implemented.

FIG. 1 illustrates an example environment 100 in which a pedestrian alert system can be implemented. In the depicted environment 100, a vehicle 102 is driving along a roadway 104 with a pedestrian 106 located near or in roadway 104. The pedestrian 106 is illustrated in FIG. 1 as a person. In other implementations, the pedestrian 106 can be a bicyclist, skateboarder, person riding a scooter, an animal, or similar object near or in the roadway 104 with which the vehicle 102 may collide. Although illustrated as an automobile, the vehicle 102 can represent other types of motorized vehicles (e.g., a passenger truck, a car, a motorcycle, a bus, a tractor, a semi-trailer truck), watercraft (e.g., a boat), or aircraft (e.g., an airplane).

The vehicle 102 includes one or more exterior sensors 108, one or more interior sensors 110, and a pedestrian alert system 112. In the depicted environment 100, the exterior sensors 108 are mounted to, or integrated within, a front portion of the vehicle 102. As described in greater detail below, the exterior sensors 108 can include camera systems, radar systems, lidar systems, or ultrasonic systems to detect and track the pedestrian 106. The exterior sensors 108 can provide sensor data regarding the pedestrian 106, including classification of (e.g., cyclist, pedestrian, animal) and tracking data for the pedestrian 106. The tracking data can, for example, indicate a relative position (e.g., range and lateral positioning), heading, or speed of the pedestrian 106 to the vehicle 102.

In the depicted implementation, the exterior sensors 108 are mounted on the front of the vehicle 102. The exterior sensors 108 can detect and track the pedestrians 106 from any exterior surface of the vehicle 102. For example, vehicle manufacturers can integrate a radar system, a lidar system, camera, or ultrasonic sensor into a bumper, side mirror, headlights, or any other interior or exterior location where pedestrians 106 require detection. In some cases, the vehicle 102 includes multiple types of exterior sensors 108, such as a radar system and a camera, that provide a larger instrument field-of-view or improved detection of pedestrians 106. In general, vehicle manufacturers can design the locations of the exterior sensors 108 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The interior sensors 110 are mounted to, or integrated within, an interior portion of the vehicle 102 to detect aspects of the driver. The interior sensors 110 can include a camera or radar system that captures images of the driver. In particular, the interior sensors 110 can be positioned to have a field-of-view that includes the driver's head. The interior sensors 110 can determine whether the driver is looking at the roadway 104, the pedestrian 106, or looking elsewhere. In this way, visual alerts regarding the pedestrian 106 can be adapted to the driver's attentiveness. As described in greater detail below, if the driver is distracted and not looking at the roadway 104, the pedestrian alert system 112 can flash a red light to regain the driver's attention and alert them that a pedestrian is in or near the roadway 104.

The pedestrian alert system 112 can provide a feedback system to alert drivers of the pedestrian 106 in or near the roadway 104 to prevent crashes and fatalities. The pedestrian alert system 112 can include a pedestrian tracker 114, a driver monitoring system 116, and an alert controller 118. The pedestrian alert system 112, the pedestrian tracker 114, the driver monitoring system 116, and the alert controller 118 can be implemented using hardware, software, firmware, or a combination thereof.

The pedestrian tracker 114 can detect and track pedestrians 106 in or near the roadway 104 based on sensor data from the exterior sensors 108. Outputs of the pedestrian tracker 114 can include the relative position of the pedestrian 106, a track and predicted track for the pedestrian 106, and a probability that the pedestrian 106 will enter a travel path of the vehicle 102.

The driver monitoring system 116 can determine whether the driver is distracted. Based on the driver's attentiveness and tracking of the pedestrian 106, the alert controller 118 can control a light bar or other display to alert the driver to the pedestrian 106. For example, the alert controller 118 can cause one or more banks of a light bar in or integrated within a dashboard of the vehicle 102 to illuminate to indicate the relative position of the pedestrian 106 and whether evasive action is required. As another example, the alert controller 118 can cause one or more banks of the light bar to flash red if a pedestrian 106 is detected in or near the roadway 104 and the driver is distracted. In this way, the pedestrian alert system 112 can improve a driver's awareness of pedestrians 106, especially in low visibility conditions or when the driver may be distracted.

Example Vehicle Configuration

Figure 2:
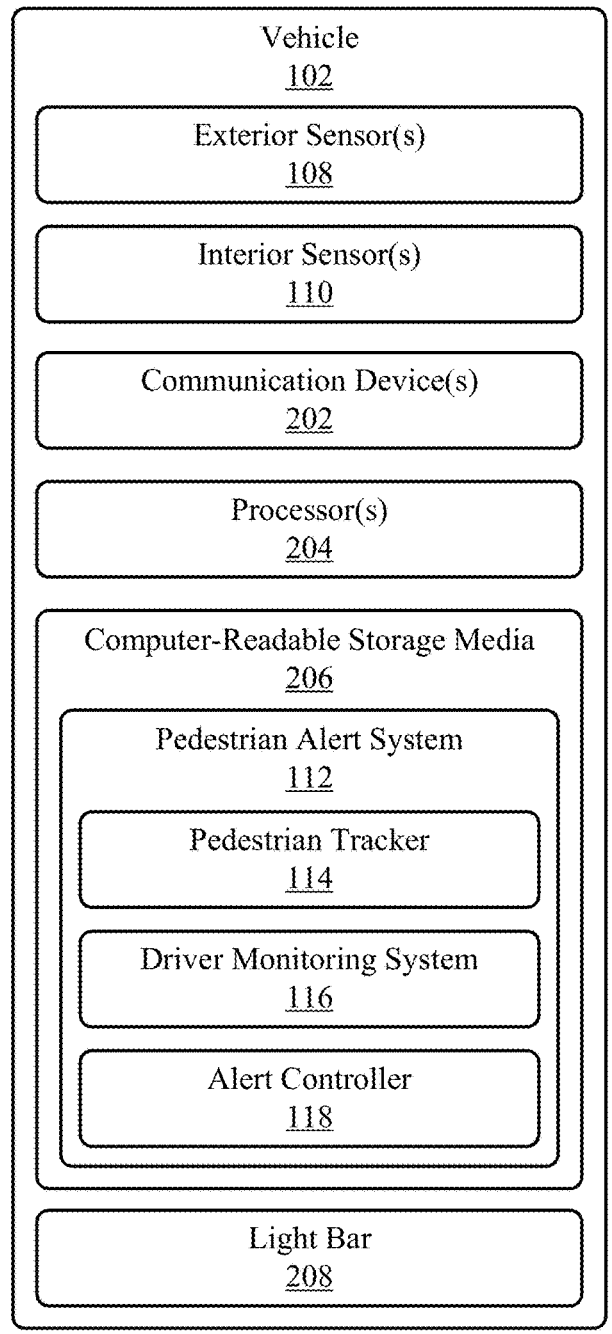
FIG. 2 illustrates an example configuration of a vehicle with a pedestrian alert system.

FIG. 2 illustrates an example configuration 200 of the vehicle 102 with the pedestrian alert system 112. As described for FIG. 1, the vehicle 102 includes the exterior sensors 108, the interior sensors 110, and the pedestrian alert system 112, which includes the pedestrian tracker 114, the driver monitoring system 116, and the alert controller 118. In addition, the vehicle 102 can include one or more communication devices 202, one or more processors 204, computer-readable storage media (CRM) 206, and a light bar 208.

The communication devices 202 can include a sensor interface, a pedestrian alert system interface, and a light bar interface. The sensor interface and the pedestrian alert system interface can transmit data (e.g., azimuth angles, range computations, and other characteristics associated with the pedestrian 106) over a communication bus of the vehicle 102, for example, when the individual components of the exterior sensors 108, the interior sensors 110, and/or the pedestrian alert system 112 are integrated within the vehicle 102. The pedestrian alert system interface can transmit control data over another communication bus of the vehicle 102 to the light bar interface in response to a detection of the pedestrian 106 in or near the roadway 104.

The processors 204 (e.g., an energy processing unit or electronic control unit) can be a microprocessor or a system-on-chip. The processors 204 can execute instructions stored in the CRM 206. For example, the processor 204 can process sensor data from the exterior sensors 108 and the interior sensors 110 and determine characteristics (e.g., relative positioning, range, and predicted tracks) for the pedestrian 106. The processor 204 can then control the operation of the light bar 208 to focus the driver's attention on the pedestrian 106 and avoid potential collisions or unsafe driving. For example, the processor 204 can control, based on data from the exterior sensors 108 and the interior sensors 110, the light bar 208 to flash red to refocus the driver's attention on the roadway 104 and a relative position of the pedestrian 106.

The pedestrian alert system 112 can be stored in the CRM 206. As described for FIG. 1, the pedestrian alert system 112 can include the pedestrian tracker 114, the driver monitoring system 116, and the alert controller 118. The pedestrian tracker 114 can detect the pedestrian 106 in or near the roadway 104 and track the path and a predicted path of the pedestrian 106 to determine whether the pedestrian 106 is in or likely to enter a travel path of the vehicle 102. The driver monitoring system 116 can determine whether a driver is attentive to the roadway 104 or the pedestrian 106 or is otherwise distracted.

Based on outputs from the pedestrian tracker 114 and the driver monitoring system 116, the alert controller 118 can control the operation of the light bar 208. The light bar 208 can, for example, be placed on or within a dashboard of the vehicle 102. In other implementations, the light bar 208 can be integrated into an instrument cluster behind the steering wheel or another display area of the vehicle. For example, the light bar 208 can be a line at a top or bottom edge of a display screen or the instrument cluster. The light bar 208 can be placed in other areas of the vehicle 102 (e.g., in or near the windshield) to focus a driver's attention on the roadway 104 and pedestrians 106.

The light bar 208 can include multiple banks or segments that the alert controller 118 causes to illuminate with different colors, intensity, or frequencies. For example, the alert controller 118 can cause one or more banks of the light bar 208 to flash red if a pedestrian 106 is detected and the driver is distracted. As another example, the alert controller 118 can cause one or more banks of the light bar 208 to light up yellow or green if a pedestrian 106 is detected near the roadway 104. The position of the one or more illuminated banks can correspond to a relative position of the pedestrian 106 to the vehicle 102. The number of banks or the width of illuminated banks can correspond to a range of the pedestrian 106 relative to the vehicle 102.

Figure 3:
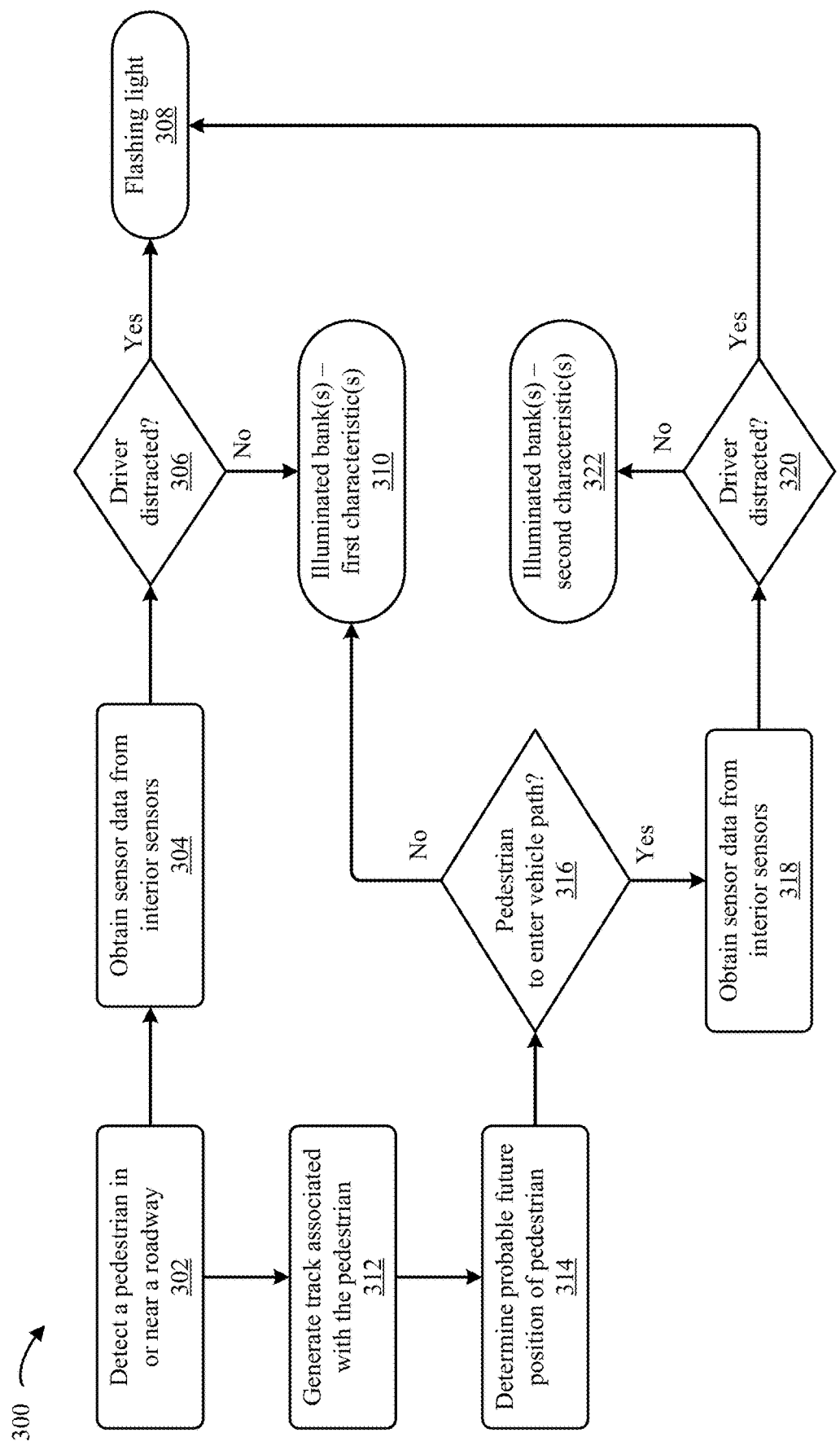
FIG. 3 illustrates an example flow chart of a pedestrian alert system to provide a visible indicator of a pedestrian in or near a roadway.

FIG. 3 illustrates an example flow chart 300 of a pedestrian alert system to provide a visible indicator of a pedestrian in or near a roadway. The pedestrian alert system of FIG. 3 can, for example, be the pedestrian alert system 112 of FIGS. 1 and 2, which can include the pedestrian tracker 114, the driver monitoring system 116, and the alert controller 118.

The flow chart 300 indicates a series of operations that the pedestrian alert system 112 can repeatedly perform as the vehicle 102 travels along the roadway 104. If multiple pedestrians 106 are in or near the roadway 104, the pedestrian alert system 112 can repeatedly perform the operations of the flow chart 300 for each pedestrian 106 in parallel or sequentially. The flow chart 300 is shown as sets of operations (or acts) performed, but not necessarily limited to the order or combinations in which the operations are shown herein. Further, any one of one or more of the operations may be repeated, combined, or reorganized to provide other methods.

At 302, the pedestrian alert system 112 or the pedestrian tracker 114 detects a pedestrian 106 in or near the roadway 104. The pedestrian 106 is detected using sensor data from the exterior sensors 108. The processing of the sensor data can be performed by the pedestrian alert system 112, the pedestrian tracker 114, or another component of the vehicle 102 (e.g., a radar system). The pedestrian alert system 112 or the pedestrian tracker 114 can also determine a classification of the pedestrian 106. The classifications can include a pedestrian, a bicyclist, a person on a scooter, or an animal.

At 304, the pedestrian alert system 112 or the driver monitoring system 116 obtains sensor data from the interior sensors 110. The sensor data includes images, radar data, or other sensor data of the driver and can be used to determine whether the driver is distracted. For example, the driver monitoring system 116 can determine whether the driver's gaze is directed at the roadway 104 and/or the pedestrian 106. Alternatively, another component of vehicle 102 can monitor the driver's gaze and provide an indication of the driver's attentiveness to the pedestrian alert system 112 or the driver monitoring system 116.

At 306, the pedestrian alert system 112 or the driver monitoring system 116 determines whether the driver is distracted. Alternatively, the pedestrian alert system 112 or the driver monitoring system 116 can determine whether the driver has noticed or likely noticed the pedestrian 106.

Responsive to a determination that the driver is distracted, the pedestrian alert system 112 or the alert controller 118 can cause the light bar 208 to output a flashing light 308. The flashing light 308 can include repeatedly illuminating multiple or all banks of the light bar 208 with a red light. If a subset of banks is illuminated, the subset of banks can correspond to a relative position of the pedestrian 106. For example, the alert controller 118 can flash three banks on a left-hand portion of the light bar 208 to indicate that the pedestrian 106 is currently positioned to the left of the vehicle 102. The flashing light 308 can be red (or another color) which is likely to catch the driver's attention. In this way, the pedestrian alert system 112 can draw the driver's gaze and attention to the roadway 104 and the pedestrian 106.

Responsive to a determination that the driver is not distracted, the pedestrian alert system 112 or the alert controller 118 can cause the light bar 208 to output one or more illuminated banks with first characteristics 310. The illuminated banks with the first characteristics 310 can be a subset of banks of the light bar 208 that indicate a relative position of the pedestrian 106. For example, the alert controller 118 can flash three banks on a left-hand portion of the light bar 208 to indicate that the pedestrian 106 is currently positioned to the left of the vehicle 102. If the pedestrian 106 is not currently in the roadway 104 or a travel path of the vehicle 102, the first characteristics can include the color green to indicate that a collision with the pedestrian 106 is not likely. If the pedestrian is currently in or near the roadway 104 or the travel path of the vehicle 102, the first characteristics can include the color yellow, orange, or red to indicate that a collision with the pedestrian 106 is likely without evasive actions.

The number of banks illuminated or a width of the illumination portion of the light bar 208 can indicate a range of the pedestrian 106 relative to the vehicle 102. For example, illumination of one bank can indicate that the pedestrian 106 is about 30 meters from the vehicle 102, while illumination of three banks can indicate that the pedestrian 106 is about 5 meters from the vehicle 102. The pedestrian alert system 112 or the alert controller 118 can vary different characteristics of the light bar 208 to indicate a relative position, range, classification, or other attribute associated with the pedestrian 106. For example, the brightness or color of the illuminated banks can indicate the likelihood of a collision with the pedestrian 106.

At 312 and responsive to detecting the pedestrian 106 in or near the roadway 104, the pedestrian alert system 112 or the pedestrian tracker 114 can generate a track associated with the pedestrian 106. The track is generated using the sensor data from the exterior sensors 108. The processing of the sensor data can be performed by the pedestrian alert system 112, the pedestrian tracker 114, or another component of the vehicle 102 (e.g., a radar system). The track indicates the relative position of the pedestrian 106 relative to the vehicle 102 over time (e.g., a series of data snapshots from the exterior sensors 108).

At 314, the pedestrian alert system 112 or the pedestrian tracker 114 can determine a probable future position of the pedestrian 106 using the track. The probable future position can indicate a relative position of the pedestrian 106 in the near future. For example, the probable future position can be determined by extending the track using a speed and heading of the pedestrian 106. The speed and heading can be based on a most-recent snapshot of sensor data or a rolling average associated with the pedestrian 106. The probable future position can include a margin of error or offsets in a lateral direction (e.g., perpendicular to the travel path of the vehicle 102) to indicate a general area in which the pedestrian 106 is likely to be in.

At 316, the pedestrian alert system 112 or the pedestrian tracker 114 can determine, using the track and/or the probable future position, whether the pedestrian 106 will enter the travel path of the vehicle 102. If the pedestrian 106 will not enter the travel path of the vehicle 102, the pedestrian alert system 112 or the alert controller 118 can cause the light bar 208 to output one or more illuminated banks with the first characteristics 310.

At 318 and responsive to determining that the pedestrian 106 will enter the travel path of the vehicle 102, the pedestrian alert system 112 or the driver monitoring system 116 obtains sensor data from the interior sensors 110. Operation 318 can reuse sensor data obtained for operation 304 or be based on updated or new sensor data from the interior sensors 110.

At 320, the pedestrian alert system 112 or the driver monitoring system 116 determines whether the driver is distracted. Alternatively, the pedestrian alert system 112 or the driver monitoring system 116 can determine whether the driver has noticed or likely noticed the pedestrian 106. Determination 320 can be the same as determination 306 or be a new determination based on new or updated sensor data from the interior sensors 110.

Responsive to a determination that the driver is distracted, the pedestrian alert system 112 or the alert controller 118 can cause the light bar 208 to output the flashing light 308. In other implementations, the pedestrian alert system 112 or the alert controller 118 can output another flashing light that flashes at a higher frequency or higher intensity than the flashing light 308 to indicate a greater urgency for the driver to return his attention or gaze to the roadway 104 and the pedestrian 106.

Responsive to the driver not being distracted, the pedestrian alert system 112 or the alert controller 118 can cause the light bar 208 to output one or more illuminated banks with second characteristics 322. The illuminated banks with the second characteristics 322 can be a subset of banks of the light bar 208 that indicate a relative position of the pedestrian 106 to the vehicle 102. For example, the alert controller 118 can flash three banks on a left-hand portion of the light bar 208 to indicate that the pedestrian 106 is currently positioned to the left of the vehicle 102. If the pedestrian 106 is not currently in the roadway 104 or a travel path of the vehicle 102, the second characteristics can be yellow or orange to indicate that a collision with the pedestrian 106 is likely based on the probable future position. If the pedestrian is currently in or near the roadway 104 or the travel path of the vehicle 102, the second color can be orange or red to indicate that a collision with the pedestrian 106 is likely without evasive actions.

FIGS. 4-1 through 4-6 illustrate example visible indicators of a pedestrian in or near a roadway generated by a pedestrian alert system in accordance with techniques of this disclosure. In the illustrated environments 400-1 through 400-6, a driver 402 is driving the vehicle 102 along the roadway 104 and the pedestrian 106 is in or near the roadway 104. The pedestrian alert system 112 provides a visible indicator 404 within the light bar 208 to indicate the presence of the pedestrian 106 to the driver 402.

Figures 1, 4:
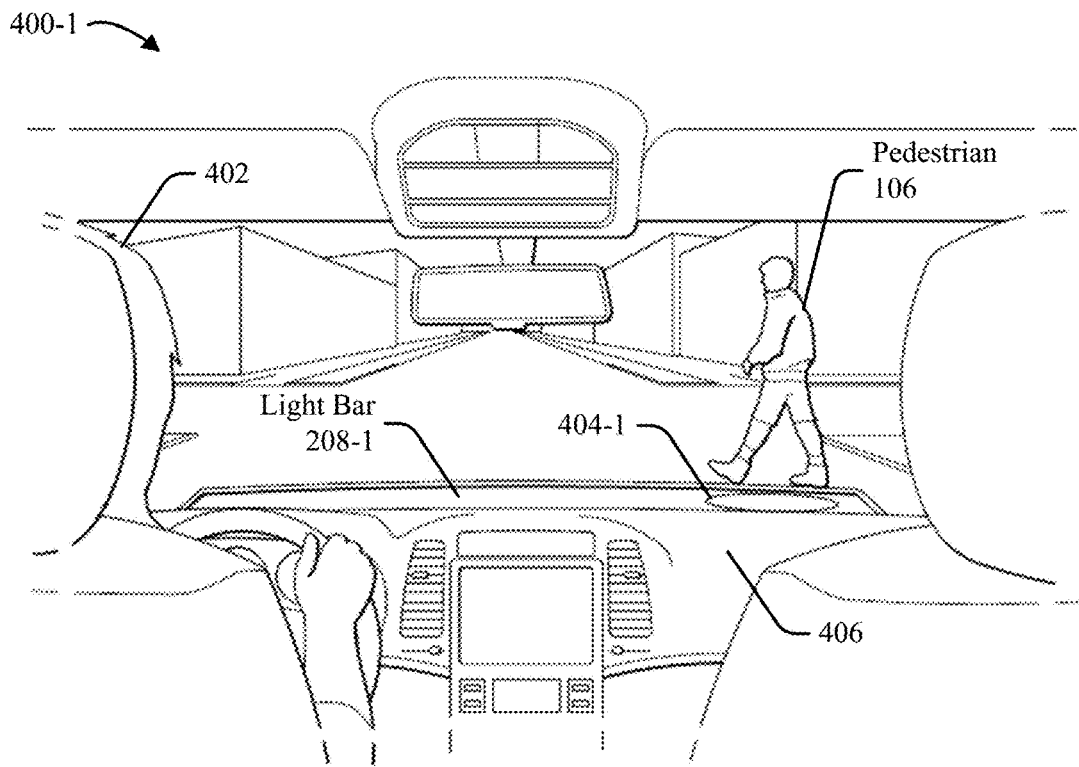
Figures 2, 4:
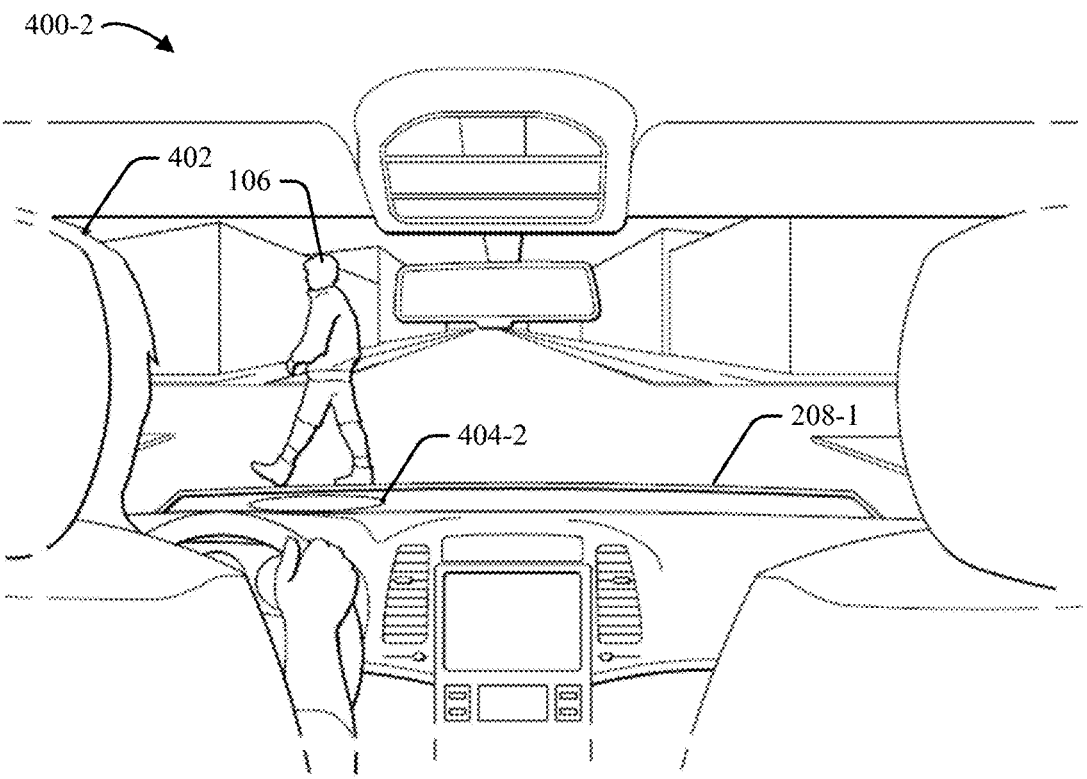
Figures 3, 4:
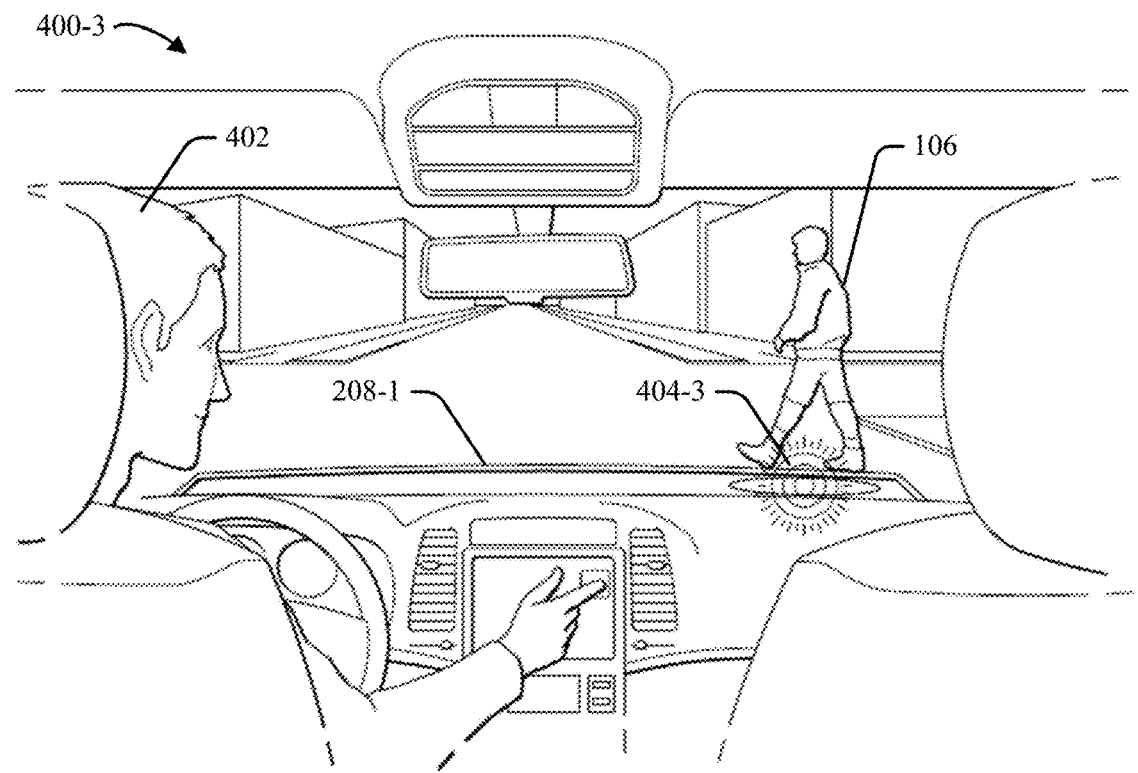
Figure 4:
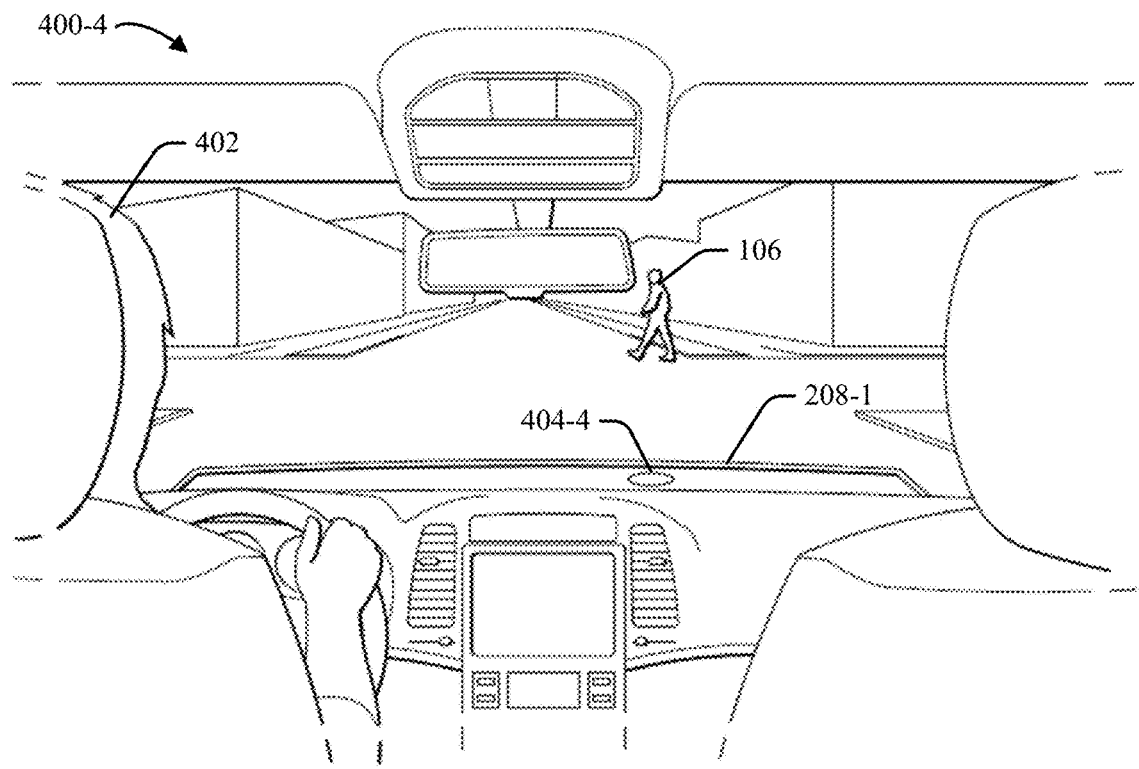

In the environment 400-1 of FIG. 4-1, the pedestrian 106 is positioned near the right-hand side of the vehicle 102. In response to detecting the pedestrian 106, the pedestrian alert system 112 controls the light bar 208-1 to provide a visible indicator 404-1 to alert the driver 402. The light bar 208-1 is positioned on top of a dashboard 406 of the vehicle 102. In other implementations, the light bar 208-1 can be integrated into the dashboard 406 or positioned above the dashboard 406. The light bar 208-1 can also be installed to reflect off of the windshield. The visible indicator 404-1 is positioned on a right-hand side of the light bar 208-1, which corresponds to the relative position of the pedestrian 106 to the vehicle 102.

In response to a determination that the driver 402 is attentive to the roadway 104 or the pedestrian 106, the visible indicator 404-1 can be a solid light (e.g., not flashing). If the pedestrian alert system 112 or another system of the vehicle 102 determines that the pedestrian 106 is currently in the travel path of the vehicle 102 or a probable future position of the pedestrian 106 is in the travel path or the roadway 104, the visible indicator 404-1 can be orange or red to indicate a potential collision.

In the environment 400-2 of FIG. 4-2, the pedestrian 106 is positioned near the left-hand side of the vehicle 102. In response to detecting the pedestrian 106, the pedestrian alert system 112 controls the light bar 208-1 to provide a visible indicator 404-2. The visible indicator 404-2 is positioned on a left-hand side of the light bar 208-1, which corresponds to the relative position of the pedestrian 106. The visible indicator 404-2 can transition laterally along the light bar 208-1 to follow or track the relative position of the pedestrian 106 as the pedestrian 106 and/or the vehicle 102 move.

In the environment 400-3 of FIG. 4-3, the pedestrian 106 is positioned near the right-hand side of the vehicle 102. In response to detecting the pedestrian 106 and determining that the driver 402 is not attentive to the roadway 104, the pedestrian alert system 112 controls the light bar 208-1 to provide a visible indicator 404-3. The visible indicator 404-3 can periodically flash and/or be colored red to draw the driver's attention to the roadway 104 and/or the pedestrian 106. Characteristics of the visible indicator 404-3 (e.g., frequency, brightness) can be configured to better draw the driver's attention. In other implementations, the visible indicator 404-3 can result in a larger portion or the entirety of the light bar 208-1 flashing red (or another color) until the driver 402 returns their attention to the roadway 104 or the pedestrian 106.

In the environment 400-4 of FIG. 4-4, the pedestrian 106 is positioned near the center of the vehicle 102 but is at a farther distance (e.g., range) from the vehicle 102 than in the environment 400-3 of FIG. 4-3. In response to detecting the pedestrian 106, the pedestrian alert system 112 controls the light bar 208-1 to provide a visible indicator 404-4. The visible indicator 404-4 is positioned near a center of the light bar 208-1, which corresponds to the relative position of the pedestrian 106 to the vehicle 102. The visible indicator 404-4, however, has a smaller width than the visible indicator 404-3 to indicate that the pedestrian 106 is farther away from the vehicle 102. The lateral width of the visible indicator 404-4 can increase or decrease to track the relative range of the pedestrian 106.

In the environment 400-5 of FIG. 4-1, the pedestrian 106 is positioned near the right-hand side of the vehicle 102. In response to detecting the pedestrian 106, the pedestrian alert system 112 controls a light bar 208-2 to provide a visible indicator 404-5. The light bar 208-2 is positioned in a top portion of an instrument cluster 408 of the vehicle 102. In other implementations, the light bar 208-2 can be integrated into a different portion of the instrument cluster 408 or into another display in or near the dashboard 406. The visible indicator 404-1 is positioned on a right-hand side of the light bar 208-1, which corresponds to the relative position of the pedestrian 106.

Figures 4, 5:
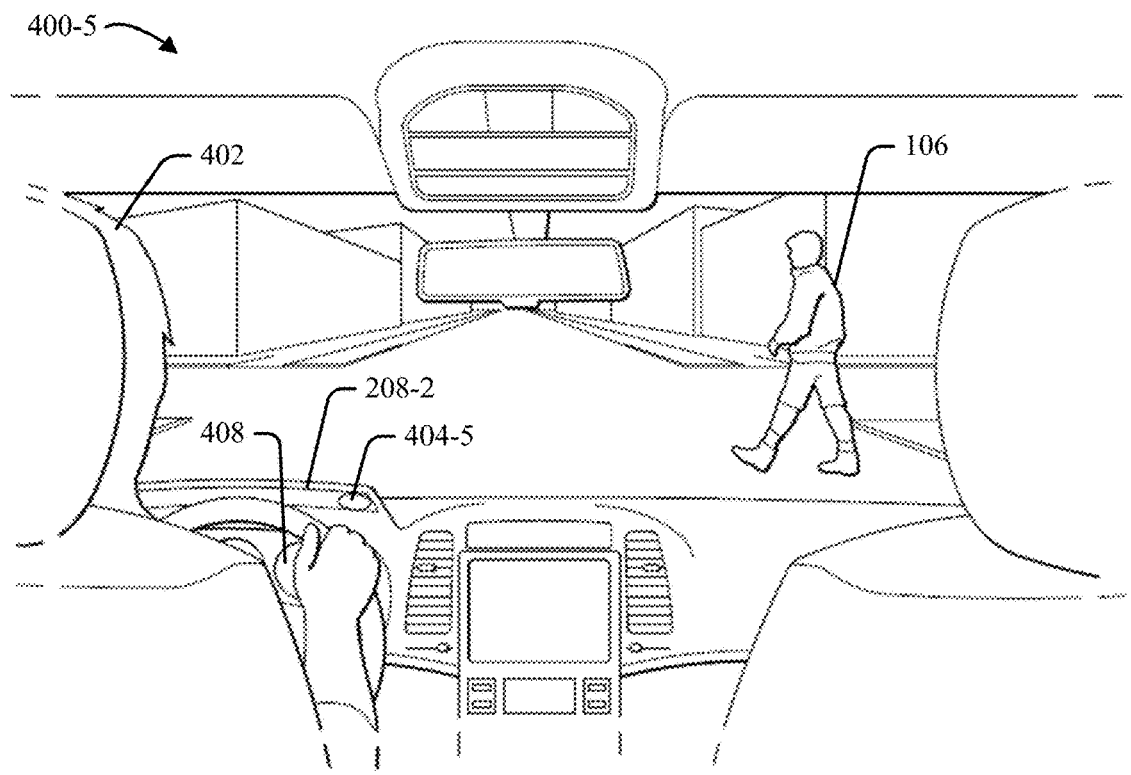
Figures 4, 5, 6:
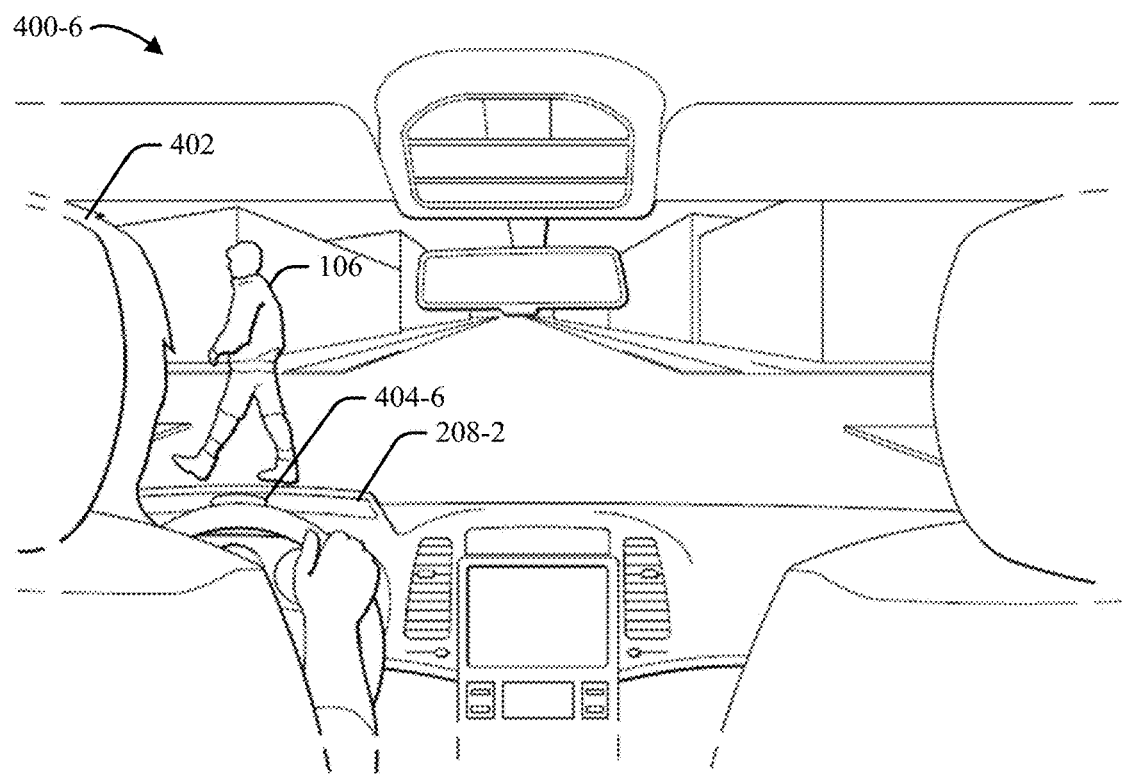
Figure 5:
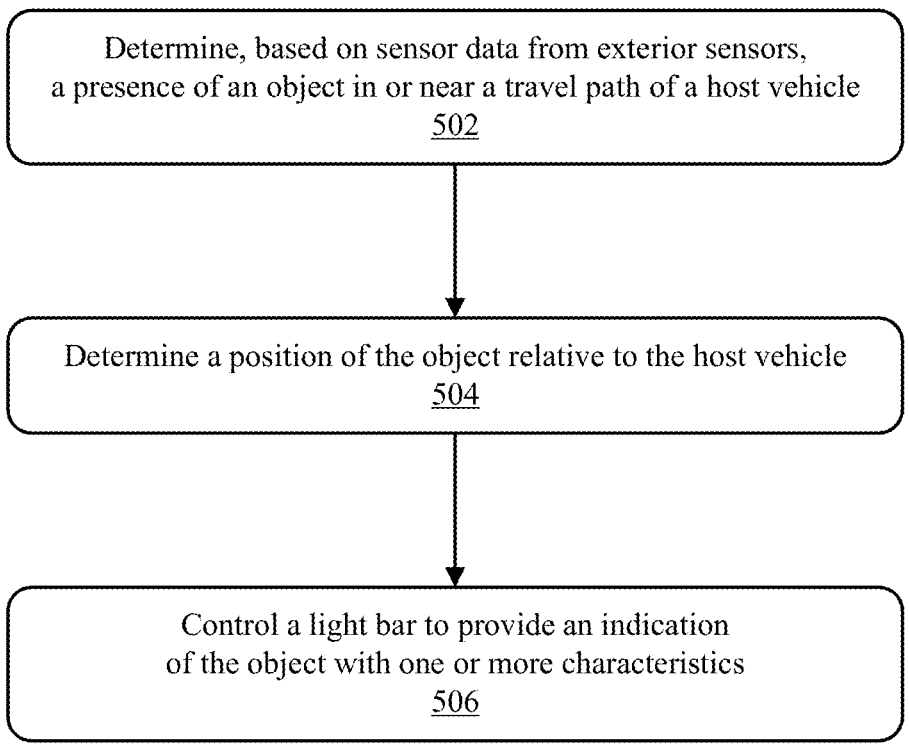

In the environment 400-6 of FIG. 4-6, the pedestrian 106 is positioned near the left-hand side of the vehicle 102. In response to detecting the pedestrian 106, the pedestrian alert system 112 controls the light bar 208-2 to provide a visible indicator 404-6. The visible indicator 404-6 is positioned on a left-hand side of the light bar 208-2, which corresponds to the relative position of the pedestrian 106. As described above, the width and position of the visible indicator 404-6 can adjust to track the relative position and range of the pedestrian 106.

Example Method

FIG. 5 illustrates an example method 400 of the pedestrian alert system 112. Method 500 is shown as sets of operations (or acts) performed, but not necessarily limited to the order or combinations in which the operations are shown herein. Further, any one of one or more of the operations may be repeated, combined, or reorganized to provide other methods. In portions of the following discussion, reference may be made to the environment 100 of FIG. 1, and entities detailed in FIGS. 1 through 4-6, reference to which is made for example only. The techniques are not limited to performance by one entity or multiple entities.

At 502, a presence of an object in or near a travel path of a host vehicle is determined based on sensor data obtained from one or more exterior sensors of the host vehicle. For example, the pedestrian alert system 112 can determine the presence of pedestrian 106 in or near the travel path of the vehicle 102 based on sensor data from the exterior sensor 108. Pedestrian 106 can be a pedestrian, a bicyclist, a skateboarder, a person on a scooter, or an animal. The exterior sensors 108 include one or more of a camera, radar system, lidar system, or ultrasonic system.

At 504, a position of the object relative to the host vehicle is determined based on the sensor data. For example, the pedestrian alert system 112 can determine the position of the pedestrian 106 relative to the vehicle 102 based on the sensor data from the exterior sensors 108. The pedestrian alert system 112 can also determine a track associated with the pedestrian 106. Based on the track, the pedestrian alert system 112 can determine a probable future position of the pedestrian 106 and whether the probable future position is in the travel path of the vehicle 102. The probable future position of the pedestrian 106 can include a positive and negative offset in a lateral direction that is approximately perpendicular to the travel path or the roadway 104. In this way, the pedestrian alert system 112 can provide a buffer zone around the pedestrian 106 and the probable future position to further reduce the chance of a collision.

At 506, a light bar is controlled to provide an indication of the object with one or more characteristics. The characteristics indicate the position of the object relative to the host vehicle. For example, the pedestrian alert system 112 can control the light bar 208 to provide an indication of the pedestrian 106. The indication has one or more characteristics that at least indicate the position of the pedestrian 106 relative to the vehicle 102. The light bar 208 can be positioned on or in the dashboard 406 of the vehicle 102. In other implementations, the light bar 208 can be integrated into a display (e.g, an instrument cluster) on, in, or near the dashboard 406.

The pedestrian alert system 112 can also control the light bar 208 to provide the indication of the pedestrian 106 with other characteristics in response to a determination that the probable future position of the pedestrian is in the travel path of the vehicle 102. The other characteristics are different than the characteristics and indicate that the probable future position of the pedestrian 106 is in the travel path of the vehicle 102. For example, the light bar 208 can provide the indication with a first color (e.g., green) when the pedestrian 106 is near roadway 104. The light bar 208 can provide the indication with a second, different color (e.g., orange or red) when the pedestrian 106 is in the roadway 104.

The characteristics and the other characteristics can further indicate a range of the pedestrian relative to the vehicle 102, a classification of the pedestrian 106 (e.g., animal, pedestrian, bicyclist), or the probable future position of the pedestrian 106. For example, the characteristics and the other characteristics can be a color, a width, a brightness, a relative position, or a height of the indication output by the light bar 208. The width of the indication can indicate a range of the pedestrian 106 relative to the vehicle 102.

The pedestrian alert system 112 can also determine, based on sensor data from the interior sensors 110, whether the driver is distracted. The interior sensors 110 can be a camera or radar system and positioned to have a field-of-view that includes a head of the driver. The pedestrian alert system 112 can determine that the driver is distracted by determining whether the driver's gaze is not directed toward the travel path or the roadway 104, not directed toward the pedestrian 106, or directed away from the travel path or the roadway 104.

In response to determining that the driver is distracted and the presence of the pedestrian 106 in or near the travel path or the roadway 104, the pedestrian alert system 112 can control the light bar to provide the indication of the pedestrian with one or more other characteristics. The other characteristics are different than the characteristics. For example, the other characteristics can be repeated flashing and/or red coloring of the indication to draw the driver's attention to the travel path, the roadway 104, or the pedestrian 106.

The pedestrian alert system 112 can also determine the presence of another pedestrian 106 in or near the travel path or the roadway 104 based on the sensor data from the exterior sensors 108. The pedestrian alert system 112 can determine a position of the other pedestrian relative to the vehicle 102 and control the light bar 208 to provide another indication of the other pedestrian 106. The other indication can, for example, be illumination of another portion of the light bar 208. In this way, the pedestrian alert system 112 can indicate the presence of multiple pedestrians in or near the roadway 104.

Examples

In the following section, examples are provided.

Example 1. A method comprising: determining, based on sensor data obtained from one or more exterior sensors of a host vehicle, a presence of an object in or near a travel path of the host vehicle; determining, based on the sensor data, a position of the object relative to the host vehicle; and controlling a light bar to provide an indication of the object with one or more characteristics, the one or more characteristics indicating at least the position of the object relative to the host vehicle.

Example 2. The method of Example 1, the method further comprising: determining, based on other sensor data obtained from one or more interior sensors of the host vehicle, whether a driver of the host vehicle is distracted; and responsive to determining that the driver of the host vehicle is distracted and the presence of the object in or near the travel path of the host vehicle, controlling the light bar to provide the indication of the object with one or more other characteristics, the one or more other characteristics different than the one or more characteristics.

Example 3. The method of Example 2, wherein the one or more other characteristics include a flashing of the indication.

Example 4. The method of Example 2 or 3, wherein: the one or more exterior sensors include at least one of a camera, a radar system, a lidar system, or an ultrasonic system; and the one or more interior sensors include at least one of a camera or a radar system.

Example 5. The method of Example 4, wherein the one or more interior sensors are positioned to have a view of a head of a driver of the host vehicle.

Example 6. The method of any one of Examples 2 through 5, wherein determining whether the driver of the host vehicle is distracted comprises: determining whether a gaze of the driver is not directed toward the travel path of the host vehicle; determining whether a gaze of the driver is not directed toward the object; or determining whether a gaze of the driver is directed away from the travel path of the host vehicle.

Example 7. The method of any one of the preceding examples, the method further comprising: determining, based on the sensor data obtained from the one or more exterior sensors, a track associated with the object; determining, based on the track, a probable future position of the object; determining whether the probable future position of the object is in the travel path of the host vehicle; and responsive to determining that the probable future position of the object is in the travel path of the host vehicle, controlling the light bar to provide the indication of the object with one or more third characteristics, the one or more third characteristics different than the one or more characteristics and indicating that the probable future position of the object is in the travel path of the host vehicle.

Example 8. The method of Example 7, wherein: the one or more characteristics include a first color of the indication; and the one or more third characteristics include a second color of the indication, the second color being different than the first color.

Example 9. The method of Example 7 or 8, wherein the probable future position of the object includes a positive and negative offset in a lateral direction, the lateral direction being approximately perpendicular to the travel path of the host vehicle.

Example 10. The method of Example 7, wherein the one or more characteristics and the one or more third characteristics further indicate at least one of a range of the object relative to the host vehicle, a classification of the object, or the probable future position of the object.

Example 11. The method of Example 10, wherein the one or more characteristics and the one or more third characteristics include at least one of a color, a width, a brightness, a relative position, or a height of the indication.

Example 12. The method of Example 11, wherein the width of the indication is configured to indicate a range of the object relative to the host vehicle.

Example 13. The method of any one of the preceding examples, the method further comprising: determining, based on the sensor data obtained from the one or more exterior sensors of the host vehicle, the presence of another object in or near the travel path of the host vehicle; determining, based on the sensor data, a position of the other object relative to the host vehicle; and controlling the light bar to provide another indication of the other object with one or more other characteristics, the one or more other characteristics indicating at least the position of the other object relative to the host vehicle.

Example 14. The method of any one of the preceding examples, wherein the light bar is positioned on or in a dashboard of the host vehicle.

Example 15. The method of any one of the preceding examples, wherein the light bar is integrated into a display on, in, or near a dashboard of the host vehicle.

Example 16. The method of any one of the preceding examples, wherein the object is a pedestrian, a bicyclist, or an animal.

Example 17. A system comprising one or more processors configured to perform the method of any one of Examples 1 through 16.

Example 18. A computer-readable storage medium comprising computer-executable instructions that, when executed, cause a processor to perform the method of any one of Examples 1 through 16.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method for alerting a driver of a host vehicle, the method comprising:
determining, based on sensor data obtained from one or more exterior sensors of the host vehicle, a presence of an object in or near a travel path of the host vehicle;
determining, based on the sensor data, a position of the object relative to the host vehicle;
determining, based on other sensor data obtained from one or more interior sensors of the host vehicle, whether the driver of the host vehicle is distracted;
responsive to determining that the driver of the host vehicle is not distracted and the presence of the object in or near the travel path of the host vehicle, controlling a light bar within an interior of the host vehicle to provide an indicator with one or more first characteristics, the one or more first characteristics indicating at least the position of the object relative to the host vehicle; or
responsive to determining that the driver of the host vehicle is distracted and the presence of the object in or near the travel path of the host vehicle, controlling the light bar to provide the indicator with one or more second characteristics, the one or more second characteristics being different from the one or more first characteristics.

2. The method of claim 1, wherein:
the one or more first characteristics include a first color of the indicator; and
the one or more second characteristics include flashing of the indicator.

3. The method of claim 2, wherein:
the one or more second characteristics further include a second color of the indicator, the second color being different than the first color.

4. The method of claim 2, wherein:
the first color indicates a likelihood of a collision between the host vehicle and the object.

5. The method of claim 1, wherein:
the method further comprises determining, based on the sensor data, a classification of an object type for the object; and
the one or more first characteristics and the one or more second characteristics further indicate the classification of the object type for the object.

6. The method of claim 5, wherein the classification of the object type includes one of a pedestrian, a bicyclist, an animal, or a person on a scooter.

7. The method of claim 1, wherein determining whether the driver of the host vehicle is distracted comprises:
determining whether a gaze of the driver is not directed toward the travel path of the host vehicle;
determining whether the gaze of the driver is not directed toward the object; or
determining whether the gaze of the driver is directed away from the travel path of the host vehicle.

8. A system comprising one or more processors configured to:
determine, based on sensor data obtained from one or more exterior sensors of a host vehicle, a presence of an object in or near a travel path of the host vehicle;
determine, based on the sensor data, a position of the object relative to the host vehicle;
determine, based on other sensor data obtained from one or more interior sensors of the host vehicle, whether the driver of the host vehicle is distracted;
responsive to a determination that the driver of the host vehicle is not distracted and the presence of the object in or near the travel path of the host vehicle, control a light bar within an interior of the host vehicle to provide an indicator with one or more first characteristics, the one or more first characteristics indicating at least the position of the object relative to the host vehicle; or
responsive to a determination that the driver of the host vehicle is distracted and the presence of the object in or near the travel path of the host vehicle, controlling the light bar to provide the indicator with one or more second characteristics, the one or more second characteristics being different from the one or more first characteristics.

9. The system of claim 8, wherein:
the one or more first characteristics include a first color of the indicator; and
the one or more second characteristics include flashing of the indicator.

10. The system of claim 9, wherein:
the one or more second characteristics further include a second color of the indicator, the second color being different than the first color.

11. The system of claim 9, wherein:
the first color indicates a likelihood of a collision between the host vehicle and the object.

12. The system of claim 8, wherein:
the one or more processors are further configured to determine, based on the sensor data, a classification of an object type for the object; and
the one or more first characteristics and the one or more second characteristics further indicate the classification of the object type for the object.

13. The system of claim 12, wherein the classification of the object type includes one of a pedestrian, a bicyclist, an animal, or a person on a scooter.

14. The system of claim 8, wherein the one or more processors are configured to determine whether the driver of the host vehicle is distracted by:
determining whether a gaze of the driver is not directed toward the travel path of the host vehicle;
determining whether the gaze of the driver is not directed toward the object; or
determining whether the gaze of the driver is directed away from the travel path of the host vehicle.

15. The system of claim 8, wherein the one or more interior sensors are positioned to have a view of a head of the driver of the host vehicle.

16. The system of claim 8, wherein the light bar is positioned on or in a dashboard of the host vehicle.

17. The system of claim 8, wherein the light bar is integrated into a display on, in, or near a dashboard of the host vehicle.

18. A non-transitory computer-readable storage medium comprising computer-executable instructions that, when executed, cause a processor to:
determine, based on sensor data obtained from one or more exterior sensors of a host vehicle, a presence of an object in or near a travel path of the host vehicle;
determine, based on the sensor data, a position of the object relative to the host vehicle;
determine, based on other sensor data obtained from one or more interior sensors of the host vehicle, whether the driver of the host vehicle is distracted;
responsive to a determination that the driver of the host vehicle is not distracted and the presence of the object in or near the travel path of the host vehicle, control a light bar within an interior of the host vehicle to provide an indicator with one or more first characteristics, the one or more first characteristics indicating at least the position of the object relative to the host vehicle; or
responsive to a determination that the driver of the host vehicle is distracted and the presence of the object in or near the travel path of the host vehicle, controlling the light bar to provide the indicator with one or more second characteristics, the one or more second characteristics being different from the one or more first characteristics.

19. The non-transitory computer-readable storage medium of claim 18, wherein:
the one or more first characteristics include a first color of the indicator; and
the one or more second characteristics include flashing of the indicator.

20. The non-transitory computer-readable storage medium of claim 18, wherein:
the non-transitory computer-readable storage medium comprises additional computer-executable instructions that, when executed, cause the processor to determine, based on the sensor data, a classification of an object type for the object; and the one or more first characteristics and the one or more second characteristics further indicate the classification of the object type for the object.

\* \* \* \* \*